(12) United States Patent
Kim et al.

(10) Patent No.: US 12,380,566 B2
(45) Date of Patent: Aug. 5, 2025

(54) METHOD OF SEPARATING TERRAIN MODEL AND OBJECT MODEL FROM THREE-DIMENSIONAL INTEGRATED MODEL AND APPARATUS FOR PERFORMING THE SAME

(71) Applicant: ELECTRONICS AND TELECOMMUNICATIONS RESEARCH INSTITUTE, Daejeon (KR)

(72) Inventors: Hye-sun Kim, Daejeon (KR); Yun Ji Ban, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 17/866,710

(22) Filed: Jul. 18, 2022

(65) Prior Publication Data

US 2023/0162363 A1 May 25, 2023

(30) Foreign Application Priority Data

Nov. 24, 2021 (KR) .................. 10-2021-0162974
Jun. 27, 2022 (KR) .................. 10-2022-0077982

(51) Int. Cl.
*G06T 7/194* (2017.01)
*G06T 7/10* (2017.01)
(Continued)

(52) U.S. Cl.
CPC .................. *G06T 7/11* (2017.01); *G06T 7/10* (2017.01); *G06T 15/04* (2013.01)

(58) Field of Classification Search
CPC .. G06T 5/00; G06T 15/04; G06T 7/10; G06T 7/194; G06T 7/11; G06T 17/05; G06T 17/20; G06T 19/20; G06T 2219/2008
See application file for complete search history.

(56) References Cited

U.S. PATENT DOCUMENTS 7,760,932 B2   7/2010 Lee et al.
2008/0221843 A1   9/2008 Shenkar et al.
(Continued)

FOREIGN PATENT DOCUMENTS

KR    1020050058085 A   6/2005
KR      101938401 B1   1/2019
(Continued)

OTHER PUBLICATIONS

Davis, J., Marschner, S. R., Garr, M., & Levoy, M. (2002). Filling holes in complex surfaces using volumetric diffusion. https://ieeexplore.ieee.org/document/1024098/ (Year: 2002).*

(Continued)

*Primary Examiner* — Gregory A Morse
*Assistant Examiner* — David Alexander Wambst
(74) *Attorney, Agent, or Firm* — Rabin & Berdo, P.C.

(57) ABSTRACT

Provided is a method of separating a terrain model and an object model from a three-dimensional integrated model and an apparatus for performing the same. A separation method according to various example embodiments includes creating separation information about an integrated model based on a multi-viewpoint image including an object on a terrain, model information of the integrated model obtained by restoring the multi-viewpoint image in three dimensions, and information of an image shooting device shooting the multi-viewpoint image, and separating a terrain model and an object model from the integrated model based on the separation information.

9 Claims, 8 Drawing Sheets

(51) Int. Cl.
  G06T 7/11    (2017.01)
  G06T 15/04   (2011.01)
  G06T 17/05   (2011.01)
  G06T 17/20   (2006.01)
  G06T 19/20   (2011.01)

(56) References Cited

U.S. PATENT DOCUMENTS

| | | | |
|---|---|---|---|
| 2008/0273759 A1* | 11/2008 | Rahmes | G06T 17/05 382/109 |
| 2011/0128286 A1 | 6/2011 | Park et al. | |
| 2013/0231897 A1* | 9/2013 | Yates | G06T 19/20 703/1 |
| 2019/0043217 A1 | 2/2019 | Estrada et al. | |
| 2020/0050716 A1 | 2/2020 | Dolan et al. | |
| 2020/0090417 A1* | 3/2020 | Schloter | G06T 5/50 |
| 2021/0158609 A1* | 5/2021 | Raskob | G06T 17/05 |

FOREIGN PATENT DOCUMENTS

| | | |
|---|---|---|
| KR | 1020190040746 A | 4/2019 |
| KR | 1020190059092 A | 5/2019 |
| KR | 1020200083616 A | 7/2020 |
| KR | 102275572 B1 | 7/2021 |

OTHER PUBLICATIONS

What is a digital elevation model (DEM)?. What is a digital elevation model (DEM)? | U.S. Geological Survey. (2018). https://www.usgs.gov/faqs/what-a-digital-elevation-model-dem (Year: 2018).*

Hart, E. (Nov. 26, 2019). Machine Learning 101: The What, Why, and How of Weighting. KDnuggets. https://www.kdnuggets.com/2019/11/machine-learning-what-why-how-weighting.html (Year: 2019).*

Spina, T. V., & Falcao, A. X. (2010). Intelligent Understanding of User Input Applied to Arc-Weight Estimation for Graph-Based Foreground Segmentation. 2010 23rd SIBGRAPI Conference on Graphics, Patterns and Images, 164-171. https://doi.org/10.1109/sibgrapi.2010.30 (Year: 2010).*

Wicklin, R. (Oct. 4, 2017). Create and interpret a weighted histogram. The DO Loop. https://blogs.sas.com/content/iml/2017/10/04/create-interpret-weighted-histogram.html (Year: 2017).*

* cited by examiner

METHOD OF SEPARATING TERRAIN MODEL AND OBJECT MODEL FROM THREE-DIMENSIONAL INTEGRATED MODEL AND APPARATUS FOR PERFORMING THE SAME

CROSS-REFERENCE TO RELATED APPLICATION

This application claims the benefit of Korean Patent Application No. 10-2021-0162974 filed on Nov. 24, 2021 and Korean Patent Application No. 10-2022-0077982 filed on Jun. 27, 2022, in the Korean Intellectual Property Office, the entire disclosure of which is incorporated herein by reference for all purposes.

BACKGROUND

1. Field of the Invention

One or more example embodiments relate to a method of separating a terrain model and an object model from a three-dimensional integrated model and an apparatus for performing the same.

2. Description of the Related Art

Recently, as VR/AR industry has been activated and a digital twin-related technology has been in the spotlight, the need for a technology to automatically restore and create a three-dimensional terrain model using two-dimensional images has increased. A three-dimensional terrain model restoration and creation technology is a technology of receiving multiple multi-view images, analyzing location and posture information of a shooting camera, and creating a realistic mesh/texture model like an image shot on the spot for the corresponding terrain. However, it is not easy to use the three-dimensional terrain model automatic restoration and creation technology in various applications, because this technology creates the entire information as an integrated mesh without distinguishing terrains and objects such as buildings and trees.

The background art described above is possessed or acquired by the inventors in the process of deriving the disclosure of the present application, and cannot necessarily be said to be a publicly known art disclosed to the general public prior to the present application.

SUMMARY

Terrains and individual objects on terrains restored using a three-dimensional terrain model automatic restoration and creation technology should be divided into respective mesh models to facilitate user interaction and handling in a virtual environment, and to be highly useful in various applications. In order to divide the restored terrains and individual objects on the terrains into respective mesh models, only terrains may be automatically created, and object information may be modeled manually. However, the higher the dependence on manual labor, the more expensive and time-consuming, and the less realistic the restoration results are, so this technique is not suitable for construct a high-quality virtual environment. Accordingly, a technology for efficiently separating objects on the restored terrains may be required.

Example embodiments provide a technology for efficiently separating a three-dimensional integrated terrain model restored based on a multi-viewpoint image into terrains and objects.

However, technical goals are not limited to the above-described technical goals, and other technical goals may exist.

According to an aspect, there is provided a separation method including creating separation information about an integrated model based on a multi-viewpoint image including an object on a terrain, model information of the integrated model obtained by restoring the multi-viewpoint image in three dimensions, and information of an image shooting device shooting the multi-viewpoint image, and separating a terrain model and an object model from the integrated model based on the separation information.

The separation information may be created based on at least one of first information and second information for estimating an area of the terrain model and an area of the object model in the integrated model, the first information may be created based on the model information, and the second information may be created based on the information of the image shooting device.

The separation information may be third information created by merging the first information and the second information, or fourth information obtained by modifying the third information by reflecting a user's input value.

The creating of the separation information may include converting the integrated model into a height map based on the model information, and creating the first information based on the height map.

The creating of the separation information may include projecting the integrated model on the multi-viewpoint image based on the information of the image shooting device, acquiring locations corresponding to the terrain model and the object model within the multi-viewpoint image on which the integrated model is projected, and creating the second information by comparing the locations corresponding to the terrain model and the object model with an object recognized in the multi-viewpoint image.

The separating may include filling a hole on the separated terrain model corresponding to the separated object model, and mapping the filled hole with an orthogonal image of the integrated model.

The separating may include restoring planar characteristics of the separated object model by optimizing the separated object model in a plane unit.

According to another aspect, there is provided an apparatus including a memory in which instructions are stored, and a processor electrically connected to the memory and configured to execute the instructions, wherein, when the instructions are executed by the processor, the processor is configured to create separation information about an integrated model based on a multi-viewpoint image including an object on a terrain, model information of the integrated model obtained by restoring the multi-viewpoint image in three dimensions, and information of an image shooting device shooting the multi-viewpoint image, and separate a terrain model and an object model from the integrated model based on the separation information.

The separation information may be created based on at least one of first information and second information for estimating an area of the terrain model and an area of the object model in the integrated model, the first information may be created based on the model information, and the second information may be created based on the information of the image shooting device.

The separation information may be third information created by merging the first information and the second information, or fourth information obtained by modifying the third information by reflecting a user's input value.

The processor may be configured to convert the integrated model into a height map based on the model information, and create the first information based on the height map.

The processor may be configured to project the integrated model on the multi-viewpoint image based on the information of the image shooting device, acquire locations corresponding to the terrain model and the object model within the multi-viewpoint image on which the integrated model is projected, and create the second information by comparing the locations corresponding to the terrain model and the object model with an object recognized in the multi-viewpoint image.

The processor may be configured to fill a hole on the separated terrain model corresponding to the separated object model, and map the filled hole with an orthogonal image of the integrated model.

The processor may be configured to restore planar characteristics of the separated object model by optimizing the separated object model in a plane unit.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
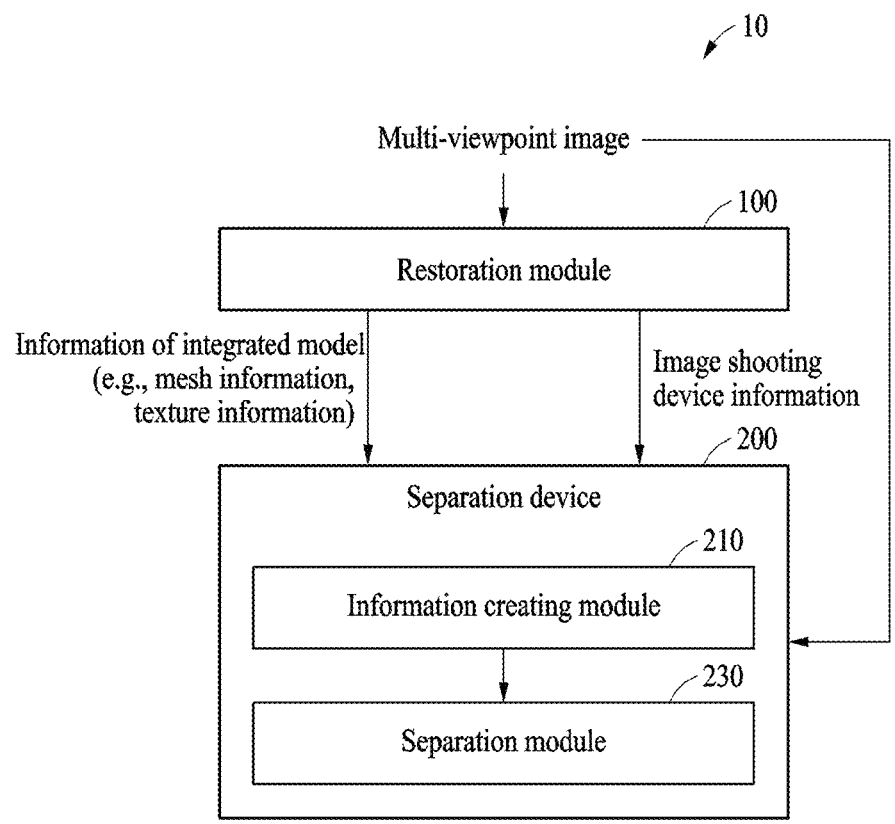
FIG. 1 is a schematic diagram illustrating a separation system according to various example embodiments.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

The singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a schematic diagram illustrating a separation system according to various example embodiments.

Referring to FIG. 1, according to various example embodiments, a separation system 10 may receive a multi-viewpoint image and create a three-dimensional model of each of terrains and objects included in the multi-viewpoint image. The separation system 10 may firstly create a model in which a terrain model and an object model are integrally combined (e.g., an integrated model), and then separate the terrain model and the object model from the integrated model. The separation system 10 may include a restoration module 100 and a separation apparatus 200.

According to various example embodiments, the restoration module 100 may create (e.g., restore) a multi-viewpoint image as a three-dimensional integrated model. In the process of creating the three-dimensional integrated model, the restoration module 100 may obtain model information of the integrated model (e.g., mesh information, texture information) and information of an image shooting device (not shown in the drawing) shooting the multi-viewpoint image (e.g., posture information, location information).

According to various example embodiments, the separation apparatus 200 may separate the terrain model and the object model from the integrated model based on the model information of the integrated model created (e.g., restored) by the restoration module 100, the information of the image shooting device (not shown) shooting the multi-viewpoint image, and the multi-viewpoint image. The separation apparatus 200 may include an information creating module 210 and a separation module 230.

According to various example embodiments, the information creating module 210 may create separation information about the integrated model based on the multi-viewpoint image, the model information of the integrated model, and the information of the image shooting device (not shown). The separation module 230 may separate the terrain model and the object model from the integrated model based on the separation information. The separation information may be created based on at least one of first information and second information for estimating an area of the terrain model and an area of the object model in the integrated model. For example, the separation information may be third information created by merging the first information and the second information, or may be fourth information obtained by modifying the third information by reflecting a user's input value. The first information may be created based on the model information, and the second information may be created based on the information of the image shooting device.

According to various example embodiments, the separation apparatus 200 may separate the terrain model and the object model with high utility from the integrated model with low utility. The separation apparatus 200 may efficiently separate and create the terrain model and the object model by a method with low dependence on manual labor, and then provide the terrain model and the object model by optimizing the models according to their characteristics.

Figure 2:
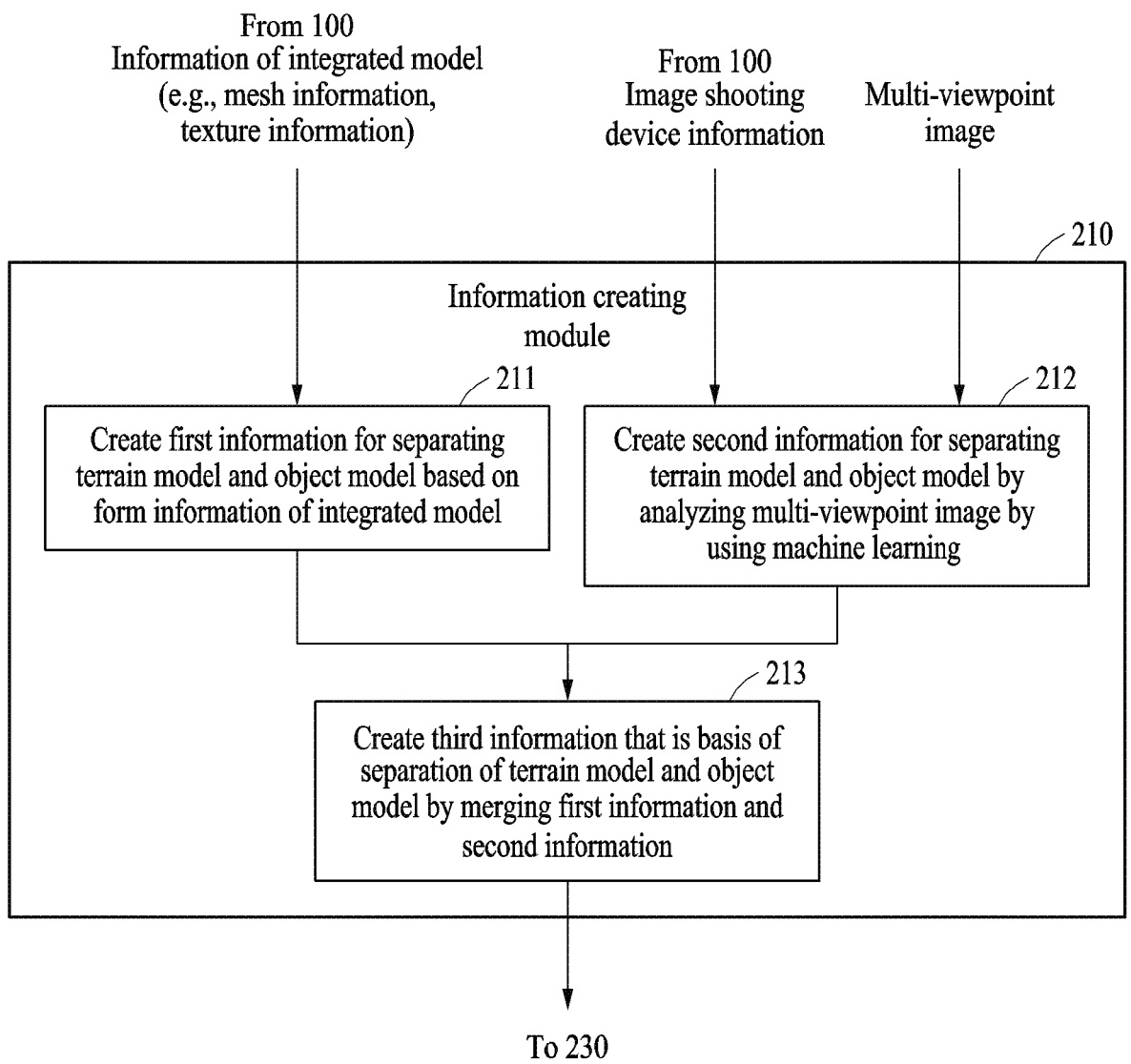
FIG. 2 is a diagram illustrating an operation of creating separation information by an information creating module according to various example embodiments.

FIG. 2 is a diagram illustrating an operation of creating separation information by an information creating module according to various example embodiments.

Operations 211 to 213 may be for explaining operations of creating the separation information for the information creating module 210 to separate the terrain model and the object model based on the model information of the integrated model, the information of the image shooting device (not shown in the drawing) shooting the multi-viewpoint image, and the multi-viewpoint image.

In operation 211, the information creating module 210 may convert the integrated model into a height map based on the model information (e.g., the mesh information and texture information of the integrated model). The height map may be obtained by sampling the integrated model with height values at regular intervals. The information creating module 210 may create the first information for estimating a specific area in the integrated model as a terrain or an object based on the height map. For example, the information creating module 210 may accumulate and aggregate the height values included in the height map into a height value bucket at regular intervals, and estimate an area corresponding to the most frequently aggregated height value as the terrain (e.g., ground). The information creating module 210 may estimate an area with a great change of height value as the object around the area estimated as the ground.

In operation 212, the information creating module 210 may project the integrated model on the multi-viewpoint image based on the information of the image shooting device (not shown in the drawing) (e.g., location information and posture information of the image shooting device). The information creating module 210 may acquire locations corresponding to the terrain model and the object model within the multi-viewpoint image on which the integrated model is projected. Further, as described below with reference to FIG. 5, the information creating module 210 may recognize an object on a terrain in the multi-viewpoint image using a machine learning technology. For example, the information creating module 210 may classify objects recognized in the multi-viewpoint image into different colors. The information creating module 210 may compare locations corresponding to the terrain model and the object model with the object recognized in the multi-viewpoint image, and create the second information for estimating a specific area in the integrated model as the terrain model or a mesh model. The second information may be information in which a specific area of the integrated model is estimated as the terrain model or the object model in units of faces of the integrated model.

In operation 213, the information creating module 210 may create the third information obtained by merging the first information and the second information according to a weight input by the user. For example, the information creating module 210 may reflect the weight input by the user to a first estimated value and a first confidence value included in the first information, and a second estimated value and a second confidence value included in the second information to create a final estimate value and a final confidence value in the face unit of the integrated model. For example, the first estimated value and the second estimated value have values of 1 for the ground, 100 for a building, and 20 for a vehicle corresponding to the area in the face unit, and the final estimated value may be a value obtained by multiplying each of the first estimated value and the second estimated value by a value between 0 and 1 and adding the values. The information creating module 210 may adopt only the final confidence value exceeding a reference confidence value input by the user, and when the final confidence value is less than the reference confidence value, the final estimated value may be created according to the fourth information obtained by modifying the third information. The fourth information may be obtained by modifying the third information by reflecting the user's input value, and the user may modify the first estimated value and the second estimated value for each face unit of the integrated model. For example, the user may newly input the first estimated value and the second estimated value through an interface (e.g., an interface of FIG. 6) for painting colors for each face unit of the integrated model.

Figure 3:
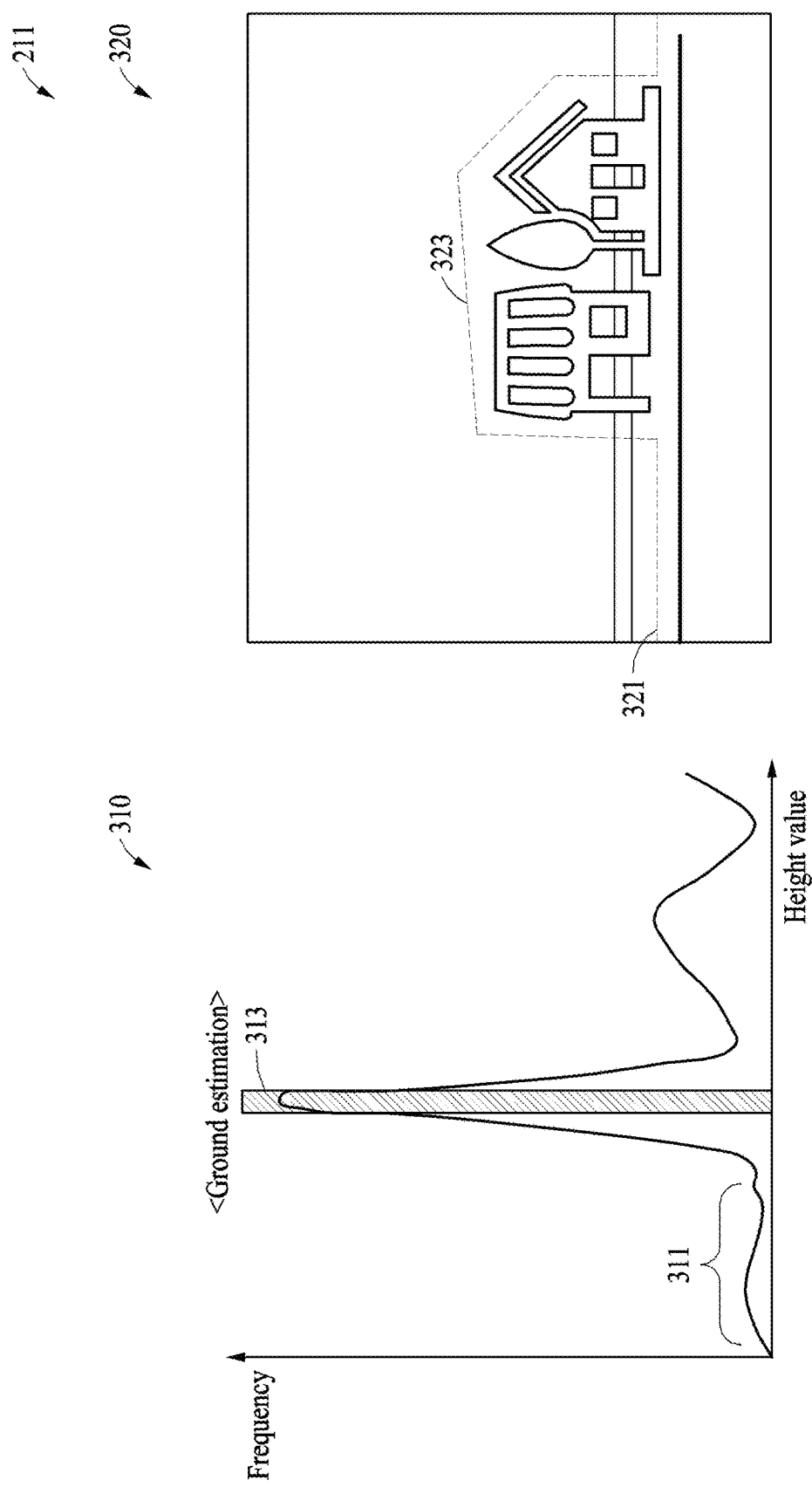
FIG. 3 is a diagram illustrating an example of an operation of creating first information according to various example embodiments.

FIG. 3 is a diagram illustrating an example of an operation of creating the first information according to various example embodiments.

Referring to FIG. 3, according to various example embodiments, the information creating module 210 may convert the integrated model into a height map 310 based on the model information (e.g., the mesh information and texture information of the integrated model). The height map 310 may be obtained by sampling the integrated model with the height values at regular intervals. The information creating module 210 may create the first information for estimating a specific area in the integrated model as the terrain or object based on the height map 310. For example, the information creating module 210 may accumulate and aggregate the height values included in the height map 310 into a height value buckets at regular intervals, and estimate a first area 321 corresponding to the most frequently aggregated height value (e.g., a first height 313) as the terrain (e.g., the ground). The information creating module 210 may create the first information for estimating an area with a great change of height value around the first area 321 as the object. For example, since the information creating module 210 has a great change of height value at a second height 311 compared to the first height 313 on the height map 310, the second information for estimating a second area 323 corresponding to the second height 311 as the object (e.g., the building) may be created.

Figure 4:
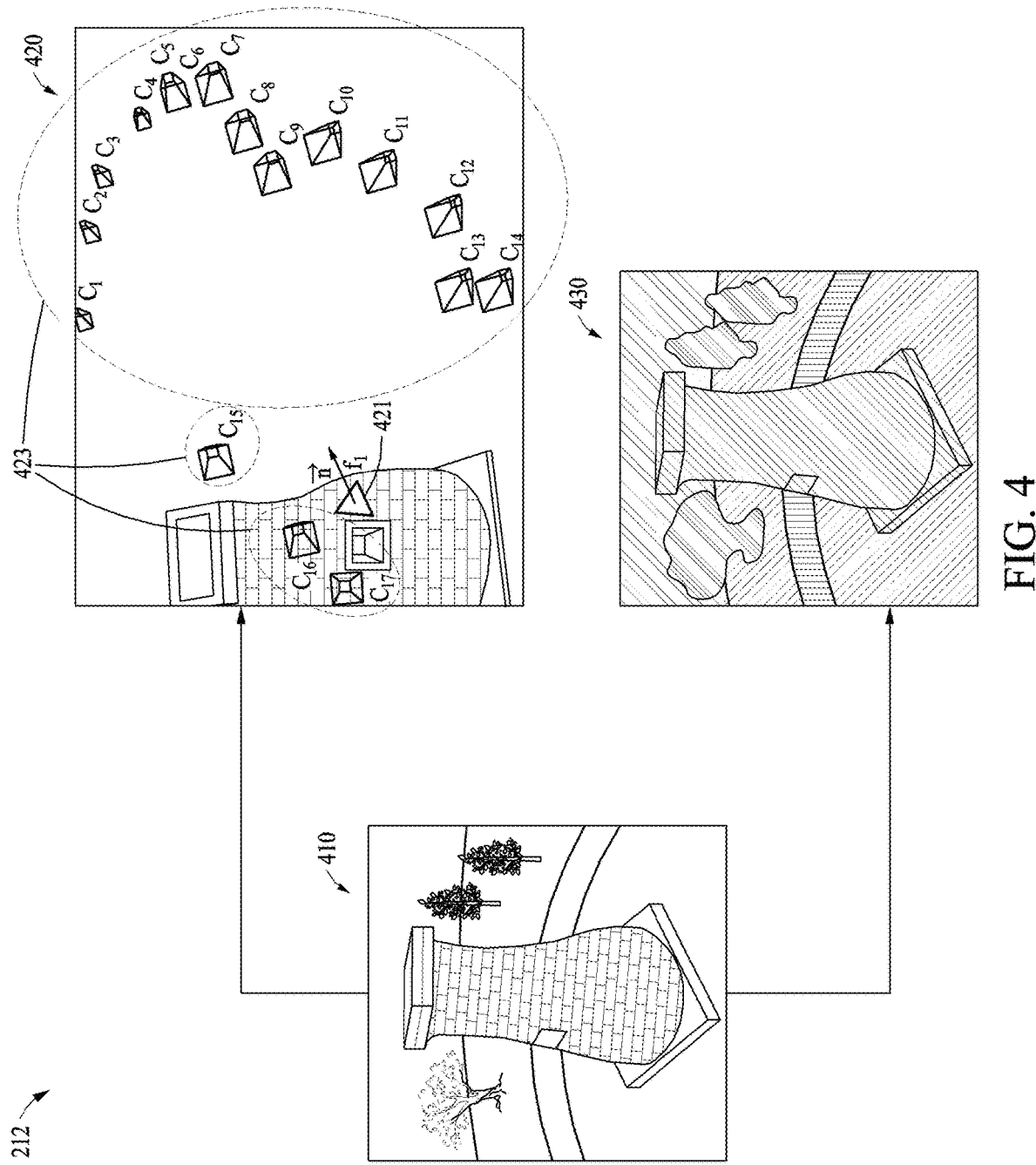
FIG. 4 is a diagram illustrating an example of an operation of creating second information according to various example embodiments.

FIG. 4 is a diagram illustrating an example of an operation of creating the second information according to various example embodiments.

Referring to FIG. 4, according to various example embodiments, the information creating module 210 may create a projection image 420 by projecting the integral model on multi-viewpoint image 410 based on the information of the image shooting device (not shown in the drawing) (e.g., the location information and posture information). The information creating module 210 may acquire locations in which the integrated model corresponds to the terrain model and the object model within the projection image 420. For example, the information creating module 210 may obtain a location 421 of a face f1 on a projection image 420 based on information 423 of the image shooting device (not shown in the drawing) (e.g., the posture information and location information).

According to various example embodiments, the information creating module 210 may recognize an object on a terrain in the projection image 420 using a machine learning technology, and create a machine learning image 430 in which recognized objects are distinguished as different colors. The information creating module 210 may compare locations corresponding to the terrain model and the object model with the objects distinguished in a machine learning image 430, and create the second information for estimating a specific area in the integrated model as the terrain model or the mesh model. The second information may be information for estimating a specific area of the integrated model as the terrain model or the object model in the face unit of the integrated model. For example, the information creating module 210 may create the second information for estimating the face f1 as the object by overlapping and comparing the location 421 of the face f1 on the projection image 420 and the machine learning image 430.

Figure 5:
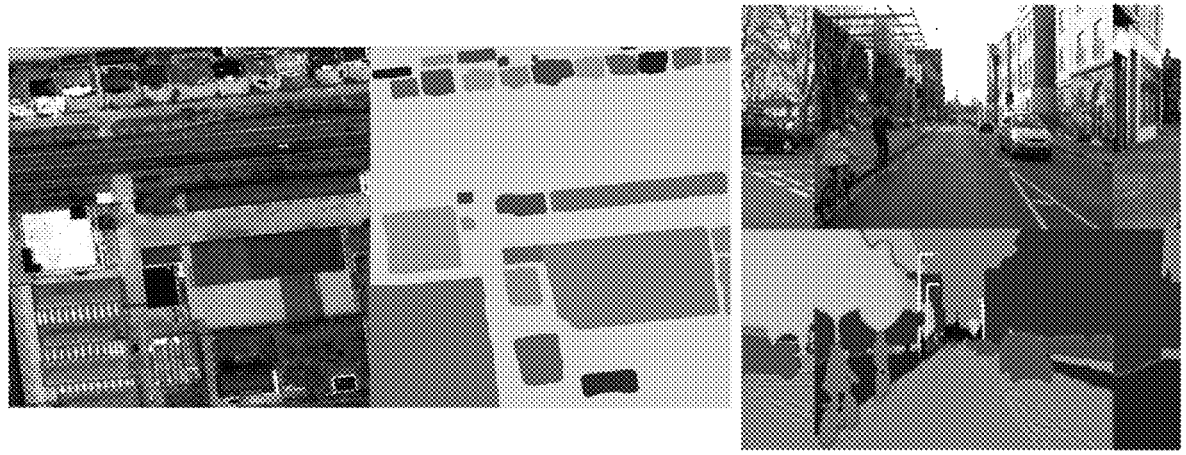
FIG. 5 is a diagram illustrating an operation of recognizing an object and a terrain in a multi-viewpoint image by using a machine learning technology by an information creating module according to various example embodiments.

FIG. 5 is a diagram illustrating an operation of recognizing an object and a terrain in a multi-viewpoint image by using a machine learning technology by an information creating module according to various example embodiments.

Referring to FIG. 5, according to various example embodiments, the information creating module (e.g., the information creating module 210 of FIG. 2) may recognize an object (e.g., ground, a building, a tree, a vehicle, etc.) on a terrain in the multi-viewpoint image by using a machine learning technology. For example, the information creating module 210 may classify objects recognized in the multi-viewpoint image into different colors.

Figure 6:
FIG. 6 is a diagram illustrating an example of an interface for creating fourth information by reflecting a user's input value of an information creating module according to various example embodiments.

FIG. 6 is a diagram illustrating an example of an interface for creating fourth information by reflecting a user's input value of an information creating module according to various example embodiments.

Referring to FIG. 6, according to various example embodiments, the information creating module (e.g., the information creating module 210) may create a final estimate value and a final confidence value in a face unit of an integrated model. The information creating module 210 may create (e.g., modify) the final estimate value according to the fourth information obtained by reflecting the user's input value to third information when the final estimate value is less than a pre-determined reference confidence value.

According to various example embodiments, the user's input value may be a color input by the user, based on classification of a terrain, an object, and the like, on an interface for painting colors for each face unit of the integrated model. The classification-based color may be predetermined and be distinguishable in the integrated model. For example, ground may be predetermined to be painted in green, a building may be predetermined to be painted in gray, and a vehicle may be predetermined to be painted in blue.

Figure 7:
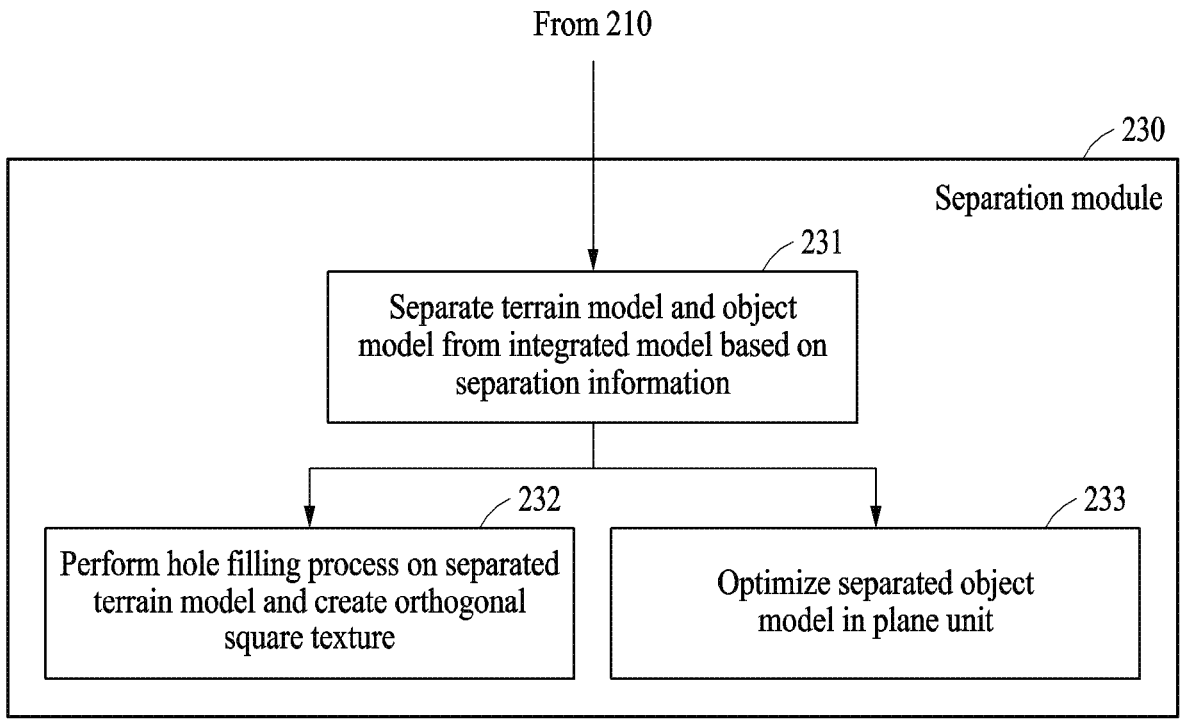
FIG. 7 is a diagram illustrating an operation of separating a terrain model and an object model by a separation module according to various example embodiments.

FIG. 7 is a diagram illustrating an operation of separating the terrain model and the object model by the separation module according to various example embodiments.

Operations 231 to 233 may be used to describe operations in which the separation module 230 separates the terrain model and the object model from the integrated model based on the separation information. The separation information may be created based on at least one of the first information and the second information for estimating the area of the terrain model and the area of the object model in the integrated model. For example, the separation information may be the third information created by merging the first information and the second information, or may be the fourth information obtained by modifying the third information by reflecting a the user's input value. The first information may be created based on the model information, and the second information may be created based on the information of the image shooting device.

In operation 231, the separation module 230 may separate the terrain model and the object model from the integrated model based on the separation information. For example, the separation module 230 may separate an area estimated to be the terrain model or the object model into the terrain model or the object model according to the separation information.

In operation 232, the separation module 230 may perform a hole filling process on the separated terrain model. The separation module 230 may fill a hole having a size corresponding to the separated object model on the separated terrain model with reference to the height value of an area around the hole. The height value of the area around the hole may be obtained from the height map. The separation module 230 may map the filled hole area of the terrain model with an orthogonal image of the integrated model. The orthogonal image may be an image viewed vertically from the top of the integrated model.

In operation 233, the separation module 230 may optimize the separated object model in a plane unit to restore planar characteristics of the separated object model. The separation module 230 may restore the planar characteristics of the object reduced in the process of restoring the multi-viewpoint image to the integrated model together with the terrain model with an emphasis on curves.

Figure 8:
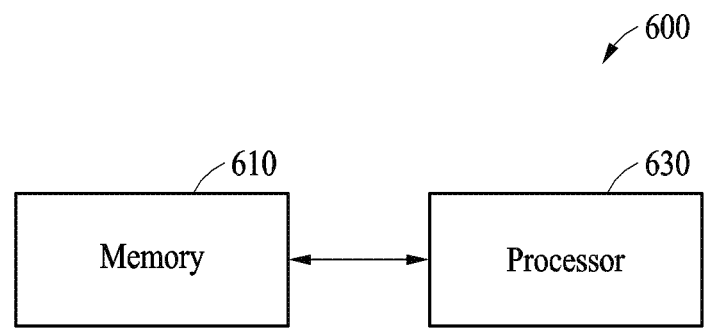
FIG. 8 is a diagram illustrating another example of a separation apparatus according to various example embodiments.

FIG. 8 is a diagram illustrating another example of a separation apparatus according to various example embodiments.

Referring to FIG. 8, according to various example embodiments, a separation apparatus 600 may include a memory 610 and a processor 630.

According to various example embodiments, the memory 610 may store instructions (e.g., a program) executable by the processor 630. For example, the instructions may include instructions for executing an operation of the processor 630 and/or an operation of each component of the processor 630.

According to various example embodiments, the memory 610 may be implemented as a volatile memory device or a nonvolatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The nonvolatile memory devices may be implemented as electrically erasable programmable read-only memory (EEPROM), flash memory, magnetic RAM (MRAM), spin-transfer torque MRAM (STT-MRAM), conductive bridging RAM (CBRAM), ferroelectric RAM (FeRAM), phase change RAM (PRAM), resistive RAM(RRAM), nanotube RRAM, polymer RAM (PoRAM), nano floating gate memory (NFGM), holographic memory, molecular electronic memory device, and/or insulator resistance change memory.

According to various embodiments, the processor 630 may execute a computer readable code (e.g., software) stored in the memory 610 and instructions induced by the processor 630. The processor 630 may be a hardware-implemented data processing device having a circuit having a physical structure for executing desired operations. The desired operations may include, for example, codes or instructions included in a program. The hardware-implemented data processing device may include, for example, a microprocessor, a central processing unit, a processor core, a multi-core processor, and a multiprocessor, an application-specific integrated circuit (ASIC), and a field programmable gate array (FPGA).

According to various example embodiments, operations performed by the processor 630 may be substantially the same as the operation of the separation apparatus 200 with reference to FIG. 1 to FIG. 7. Each component (e.g., the information creating module 210 and the separation module 230) of the separation apparatus 200 described with reference to FIG. 1 to FIG. 7 may be executed by the processor 630. Accordingly, detailed descriptions thereof are omitted.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. For example, the apparatus, method, and components described in example embodiments may be implemented using one or more general-purpose or special purpose computers, such as, for example, a processor, a controller, an arithmetic logic unit (ALU), a digital signal processor, a microcomputer, a FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:
1. A separation method, comprising:
  creating separation information about an integrated model based on a multi-viewpoint image including an object on a terrain, model information of the integrated model obtained by restoring the multi-viewpoint image in three dimensions, and information of an image shooting device shooting the multi-viewpoint image; and
  separating a terrain model and an object model from the integrated model based on the separation information;
  wherein the separating comprises:
  filling a hole on the separated terrain model corresponding to the separated object model; and mapping the filled hole with an orthogonal image of the integrated model;

wherein the separation information is created based on at least one of first information and second information for estimating an area of the terrain model and an area of the object model in the integrated model, and the first information is created based on the model information, and the second information is created based on the information of the image shooting device;

wherein the creating of the separation information comprises:

projecting the integrated model on the multi-viewpoint image based on the information of the image shooting device;

acquiring locations corresponding to the terrain model and the object model within the multi-viewpoint image on which the integrated model is projected; and creating the second information by comparing the locations corresponding to the terrain model and the object model with an object recognized through machine learning in the multi-viewpoint image; and wherein the separating further comprises:

reflecting a weight input by a user to a first estimated value and a first confidence value included in the first information, and to a second estimated value and a second confidence value included in the second information, to create a final estimated value and a final confidence value; and adopting the final confidence value if the final confidence value exceeds a reference confidence value input by the user;

wherein the final estimated value is obtained by multiplying each of the first estimated value and the second estimated value by a value between 0 and 1 to obtain a first estimated multiplied value and a second estimated multiplied value, and adding the first estimated multiplied value and the second estimated multiplied value.

2. The separation method of claim 1, wherein the separation information is third information created by merging the first information and the second information, or fourth information obtained by modifying the third information by reflecting a user's input value.

3. The separation method of claim 1, wherein the creating of the separation information comprises:

converting the integrated model into a height map based on the model information; and creating the first information based on the height map.

4. The separation method of claim 1, wherein the separating comprises restoring planar characteristics of the separated object model by optimizing the separated object model in a plane unit.

5. A computer program stored in a non-transitory computer-readable recording medium in combination with hardware to execute the method of claim 1.

6. An apparatus comprising:

a memory in which instructions are stored; and a processor electrically connected to the memory and configured to execute the instructions, wherein, when the instructions are executed by the processor, the processor is configured to:

create separation information about an integrated model based on a multi-viewpoint image including an object on a terrain, model information of the integrated model obtained by restoring the multi-viewpoint image in three dimensions, and information of an image shooting device shooting the multi-viewpoint image;

separate a terrain model and an object model from the integrated model based on the separation information;

fill a hole on the separated terrain model corresponding to the separated object model; and map the filled hole with an orthogonal image of the integrated model;

wherein the separation information is created based on at least one of first information and second information for estimating an area of the terrain model and an area of the object model in the integrated model, and the first information is created based on the model information, and the second information is created based on the information of the image shooting device;

wherein the processor is further configured to:

project the integrated model on the multi-viewpoint image based on the information of the image shooting device;

acquire locations corresponding to the terrain model and the object model within the multi-viewpoint image on which the integrated model is projected; and create the second information by comparing the locations corresponding to the terrain model and the object model with an object recognized through machine learning in the multi-viewpoint image; and wherein to separate the terrain model and the object model from the integrated model, the processor is further configured to:

reflect a weight input by a user to a first estimated value and a first confidence value included in the first information, and to a second estimated value and a second confidence value included in the second information, to create a final estimated value and a final confidence value; and adopt the final confidence value if the final confidence value exceeds a reference confidence value input by the user;

wherein the final estimated value is obtained by multiplying each of the first estimated value and the second estimated value by a value between 0 and 1 to obtain a first estimated multiplied value and a second estimated multiplied value, and adding the first estimated multiplied value and the second estimated multiplied value.

7. The apparatus of claim 6, wherein the separation information is third information created by merging the first information and the second information, or fourth information obtained by modifying the third information by reflecting a user's input value.

8. The apparatus of claim 6, wherein the processor is further configured to:

convert the integrated model into a height map based on the model information; and create the first information based on the height map.

9. The apparatus of claim 6, wherein the processor is further configured to:

restore planar characteristics of the separated object model by optimizing the separated object model in a plane unit.

* * * * *